United States Patent
Tandra et al.

(10) Patent No.: US 9,648,620 B2
(45) Date of Patent: May 9, 2017

(54) TONE ALLOCATION FOR MULTIPLE ACCESS WIRELESS NETWORKS

(71) Applicant: QUALCOMM Incorporated, San Diego, CA (US)

(72) Inventors: Rahul Tandra, San Diego, CA (US); Sameer Vermani, San Diego, CA (US); Bin Tian, San Diego, CA (US); Albert Van Zelst, Woerden (NL)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 14/467,779

(22) Filed: Aug. 25, 2014

(65) Prior Publication Data

US 2015/0063255 A1    Mar. 5, 2015

Related U.S. Application Data

(60) Provisional application No. 61/871,221, filed on Aug. 28, 2013.

(51) Int. Cl.
- *H04W 72/04* (2009.01)
- *H04J 11/00* (2006.01)
- *H04L 5/00* (2006.01)
- *H04L 27/26* (2006.01)

(52) U.S. Cl.
CPC ..... *H04W 72/0453* (2013.01); *H04J 11/0023* (2013.01); *H04L 5/0037* (2013.01); *H04J 2011/0009* (2013.01); *H04L 27/2613* (2013.01)

(58) Field of Classification Search
CPC ............ H04W 72/0453; H04L 5/0037; H04L 27/2613; H04J 11/0023; H04J 2011/0009
See application file for complete search history.

(56) References Cited

U.S. PATENT DOCUMENTS

| | | |
|---|---|---|
| 7,274,652 B1 | 9/2007 | Webster et al. |
| 7,539,260 B2 | 5/2009 | Van Zelst et al. |
| 8,743,837 B2 | 6/2014 | Van Zelst et al. |
| 2010/0061334 A1 | 3/2010 | Gault et al. |
| 2010/0107042 A1* | 4/2010 | Sawai ............ H04L 7/2675 714/799 |

(Continued)

OTHER PUBLICATIONS

Cheong M. et al., (ETRI): "Considerations on Functional Requirements for HEW", May 15, 2013, 12 pages.

(Continued)

*Primary Examiner* — Gbemileke J Onamuti
(74) *Attorney, Agent, or Firm* — Toler Law Group, PC

(57) ABSTRACT

A method includes generating a data packet at an access point. The data packet is to be communicated using a waveform that includes a first set of tones that is allocated to a first destination device and a second set of tones that is allocated to a second destination device. The first set of tones is non-overlapping with respect to the second set of tones, and each tone of the first set of tones and each tone of the second set of tones is an orthogonal frequency-division multiple access (OFDMA) tone. The method also includes transmitting the data packet to the first destination device via an institute of electrical and electronics engineers (IEEE) 802.11 wireless network and transmitting the data packet to the second destination device via the IEEE 802.11 wireless network.

30 Claims, 10 Drawing Sheets

(56) References Cited

U.S. PATENT DOCUMENTS

| | | |
|---|---|---|
| 2012/0170563 A1 | 7/2012 | Abraham et al. |
| 2012/0263090 A1 | 10/2012 | Porat et al. |
| 2012/0263156 A1 | 10/2012 | Abraham et al. |
| 2013/0195092 A1 | 8/2013 | Zhang et al. |
| 2013/0208822 A1* | 8/2013 | Zhang .................. H04L 5/001 375/295 |
| 2013/0286959 A1* | 10/2013 | Lou .................. H04W 72/04 370/329 |
| 2014/0369276 A1* | 12/2014 | Porat .................. H04L 5/003 370/329 |
| 2015/0319700 A1* | 11/2015 | Oteri .................. H04W 52/10 455/127.1 |

OTHER PUBLICATIONS

International Search Report and Written Opinion—PCT/US2014/052647—ISA/EPO—Nov. 6, 2014, 12 pages.
Koskela T. et al., "Discussion on Potential Techniques for HEW", Renesas Mobile Corporation, Jul. 15, 2013, 13 pages.

* cited by examiner

4 Station OFDMA Packet with Interleaved Tone Allocation

TONE ALLOCATION FOR MULTIPLE ACCESS WIRELESS NETWORKS

I. CROSS-REFERENCE TO RELATED APPLICATIONS

The present application claims priority from U.S. Provisional Patent Application No. 61/871,221 filed on Aug. 28, 2013, the contents of which are expressly incorporated by reference in their entirety.

II. FIELD

The present disclosure is generally related to allocating tones in a multiple access wireless network.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Various wireless protocols and standards may be available for use by wireless telephones and other wireless devices. For example, Institute of Electrical and Electronics Engineers (IEEE) 802.11, commonly referred to as "Wi-Fi," is a standardized set of wireless local area network (WLAN) communication protocols. In Wi-Fi protocols, data transmitted between wireless devices may be communicated according to orthogonal frequency-division multiplexing (OFDM). In OFDM packets are typically transmitted by a source device to a specific destination device.

IV. SUMMARY

High Efficiency Wi-Fi (HEW) is an IEEE 802.11 study group (SG) to explore potential updates and revisions to Wi-Fi standards to improve efficiency and operational performance in certain use cases. Orthogonal frequency-division multiple access (OFDMA) is a type of system design that may be used for HEW to improve performance. OFDMA is a multi-user version of OFDM in which different tones (e.g., frequency ranges or "subcarriers") are allocated on a per-user (e.g., per-destination device) basis.

To incorporate OFDMA into Wi-Fi, various OFDMA physical layer (PHY) parameters and designs may be used. The present disclosure provides OFDMA tone allocation plans for use with a wireless communication (e.g., IEEE 802.11) system.

In a particular embodiment, a method includes generating a data packet at an access point. The data packet is to be communicated using a waveform that includes a first set of tones that is allocated to a first destination device and a second set of tones that is allocated to a second destination device, where the first set of tones is non-overlapping with respect to the second set of tones, and where each tone of the first set of tones and each tone of the second set of tones is an OFDMA tone. The method also includes transmitting the data packet to the first destination device via an institute of electrical and electronics engineers (IEEE) 802.11 wireless network and transmitting the data packet to the second destination device via the IEEE 802.11 wireless network. For example, an IEEE 802.11 wireless network may be a network that is compliant with at least one IEEE 802.11 standard.

In another particular embodiment, a method includes receiving an uplink communication (e.g., corresponding to an uplink data packet) at an access point via an IEEE 802.11 wireless network. The uplink communication is communicated using a waveform that includes a first set of tones allocated to a first destination device and a second set of tones allocated to a second destination device. The first set of tones includes data transmitted by the first destination device and the second set of tones includes data transmitted by the second destination device.

In another particular embodiment, a method includes transmitting a data packet from an access point to each of a plurality of destination devices via an institute of electrical and electronics engineers (IEEE) 802.11 wireless network. The data packet is communicated using a waveform that includes at least one pilot tone allocated to a single destination device. In one example, the data packet may include 2 pilot tones per destination device.

In another particular embodiment, a method includes transmitting a data packet from an access point to each of a plurality of destination devices via an institute of electrical and electronics engineers (IEEE) 802.11 wireless network. The data packet is communicated using a waveform that includes at least one pilot tone that is allocated to multiple destination devices.

In another particular embodiment, a method includes transmitting a data packet from an access point to each of a plurality of destination devices via an institute of electrical and electronics engineers (IEEE) 802.11 wireless network. The data packet is communicated using a waveform that includes 12 data tones per destination device. In one example, the data packet is transmitted over a 20 megahertz (MHz) channel (e.g., a channel having 20 MHz bandwidth).

In another particular embodiment, a method includes transmitting a data packet from an access point to each of a plurality of destination devices via an institute of electrical and electronics engineers (IEEE) 802.11 wireless network. The data packet is communicated using a waveform that includes 36, 72, 120, 156, or 312 data tones per destination device.

In another particular embodiment, a method includes receiving, at a destination device, a data packet from an access point via an IEEE 802.11 wireless network. The data packet includes data directed to each of a plurality of destination devices. The method also includes identifying, based on a preamble of the data packet (e.g., a HEW signal (HEW-SIG) field), a set of data tones that are allocated to the destination device. The method further includes processing the set of data tones to determine the data directed to the destination device. In one example, each of the destination devices is associated with a minimum HEW processing bandwidth (e.g., 5 MHz).

In another particular embodiment, a method includes determining first interleaver output of a first interleaver configured to interleave N data tones based on a second interleaver configured to interleave M data tones. N is an integer greater than or equal to one and M is an integer that is greater than N. The determining includes inputting the N data tones and M–N zero-data tones into the second interleaver to generate a second interleaver output. The determining also includes removing the M–N zero-data tones from the second interleaver output to generate the first interleaver output.

One particular advantage provided by at least one of the disclosed embodiments is availability of physical layer (PHY) OFDMA parameters for use by source devices (e.g., access points) and destination devices to communicate over an IEEE 802.11 wireless network. For example, selected parameters described herein may be stored in a memory of the source and destination devices, standardized by a wireless standard (e.g., an IEEE 802.11 standard), etc. Other parameters, such as interleaver parameters for "unknown" interleavers, may be dynamically determined from "known" parameters of "known" interleavers. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
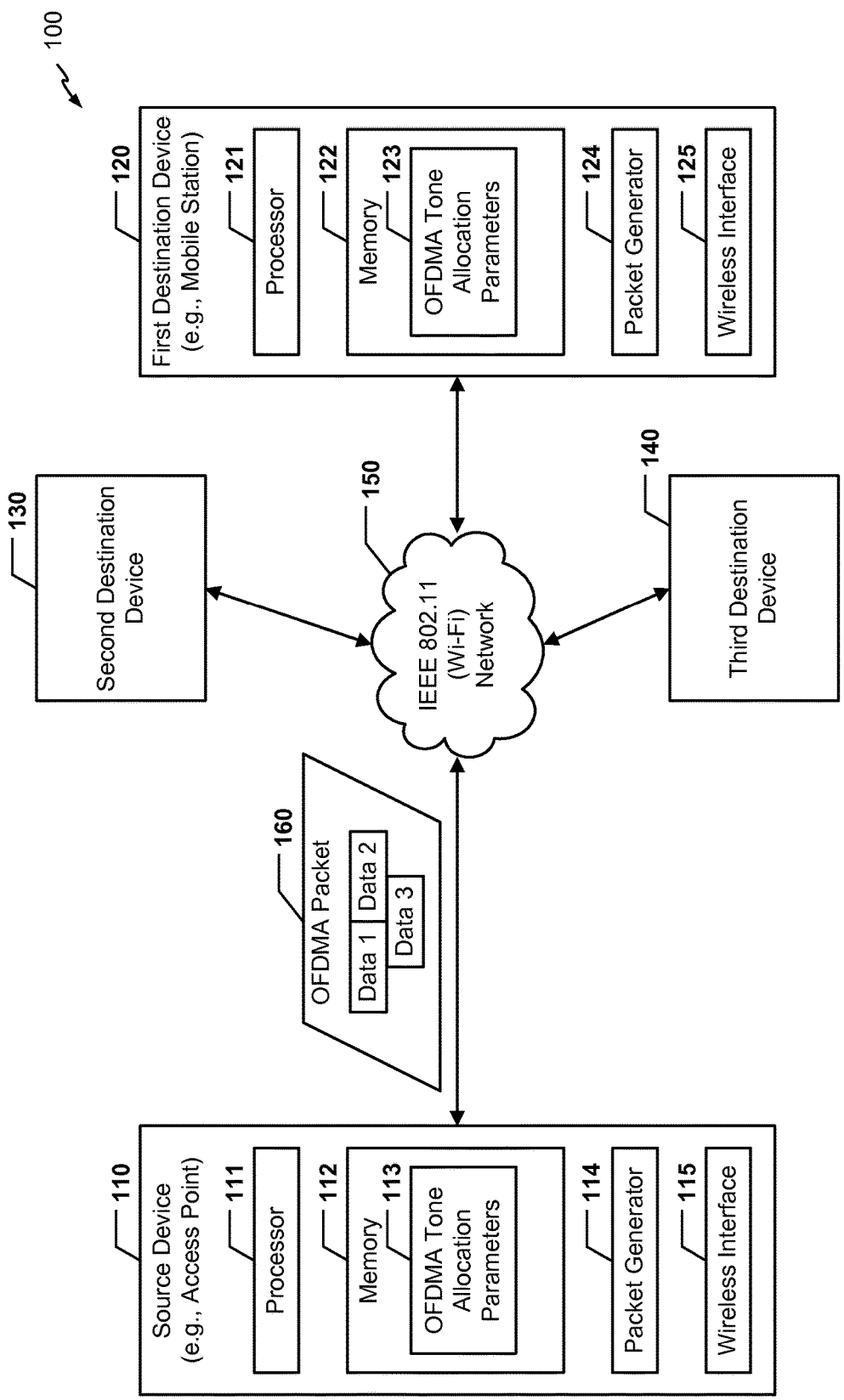
FIG. 1 is a diagram to illustrate a particular embodiment of a system that is operable to perform tone allocation for a multiple access wireless network.

Referring to FIG. 1, a system that is operable to perform tone allocation for a multiple access wireless network is shown and generally designated 100. The system 100 includes a source device 110 configured to wirelessly communicate with a plurality of destination devices 120, 130, and 140 via a wireless network 150. In an illustrative embodiment, the source device 110 is an access point and one or more of the destination devices 120, 130 and 140 are stations. In alternate embodiments, a different number and types of source devices and/or destination devices may be included in the system 100. For example, additional types of destination devices that may be included in the system 100 include, but are not limited to, sensors and receivers.

In a particular embodiment, the wireless network 150 is an Institute of Electrical and Electronics Engineers (IEEE) 802.11 wireless network (e.g., a Wi-Fi network). For example, the wireless network 150 may operate in accordance with an IEEE 802.11 standard. In an illustrative embodiment, the wireless network 150 is an 802.11 high efficiency Wi-Fi (HEW) network. In a particular embodiment, the wireless network 150 supports multiple access communication. For example, the wireless network 150 may support communication of a single packet 160 (e.g., a data packet) to each of the destination devices 120, 130, and 140, where the single packet 160 includes individual data portions directed to each of the destination devices. In one example, the packet 160 may be an orthogonal frequency-division multiple access (OFDMA) packet, as further described herein.

The source device 110 may be an access point (AP) or other device configured to generate and transmit multiple access packet(s) to multiple destination devices. In a particular embodiment, the source device 110 includes a processor 111 (e.g., a central processing unit (CPU), a digital signal processor (DSP), a network processing unit (NPU), etc.), a memory 112 (e.g., a random access memory (RAM), a read-only memory (ROM), etc.), and a wireless interface 115 configured to send and receive data via the wireless network 150. The memory 112 may store tone allocation parameters 113 (e.g., OFDMA physical layer (PHY) tone allocation parameters) used by a packet generator 114 to generate the packet 160. The packet generator 114 may generate single access packets as well as multiple access packets.

When a packet (e.g., the packet 160) is communicated over a wireless medium, the packet may be communicated using a waveform that is modulated over a fixed frequency band during a fixed period of time. The frequency band may be divided into one or more "tones" and the period of time may be divided into one or more "symbols." As an illustrative non-limiting example, a 20 MHz frequency band may be divided into four 5 MHz tones and an 80 microsecond period may be divided into twenty 4 microsecond symbols. Accordingly, a "tone" may represent a frequency sub-band included in a waveform. A tone may alternately be referred to as a subcarrier. A "tone" may thus be a frequency domain unit. A "symbol" may be a time domain unit representing a duration of time included in the waveform. The waveform for a wireless packet may thus be visualized as a two-dimensional structure that includes multiple tones and multiple symbols. For the example packets illustrated in FIGS. 2-4 and further described herein, tones are illustrated on a vertical axis and symbols are illustrated on a horizontal axis.

As an example, a wireless device may receive a packet via a 20 megahertz (MHz) wireless channel (e.g., a channel having 20 MHz bandwidth). The wireless device may perform a 64-point fast Fourier transform (FFT) to determine 64 tones in a waveform of the packet. A subset of the tones may be considered "useable" and the remaining tones may be considered "unusable" (e.g., may be guard tones, direct current (DC) tones, etc.). To illustrate, 56 of the 64 tones may be useable, including 52 data tones and 4 pilot tones. As another example, there may be 48 data tones and 4 pilot tones. It should be noted that the aforementioned channel bandwidths, transforms, and tone plans are for example. In alternate embodiments, different channel bandwidths (e.g., 5 MHz, 6 MHz, 6.5 MHz, 40 MHz, 80 MHz, etc.), different transforms (e.g., 256-point FFT, 1024-point FFT, etc.), and/or different tone plans may be used.

In a particular embodiment, the tone allocation parameters 113 may be used by the packet generator 114 during generation of a multiple access packet to determine which data tones and/or pilot tones are to be allocated to individual destination devices or combinations of destination devices. For example, the packet 160 may be communicated using a waveform that includes non-overlapping sets of tones, where each of the non-overlapping sets of tones is allocated to an individual destination device 120, 130, or 140. To illustrate, communication of the packet 160 may utilize localized tone allocation without frequency hopping, as further described with reference to FIG. 2. Alternately, communication of the packet 160 may utilize localized tone allocation with frequency hopping, as further described with reference to FIG. 3. In another embodiment, communication of the packet 160 may utilize interleaved tone allocation, as further described with reference to FIG. 4. Additional examples of tone allocation plans are described with reference to FIG. 5.

The destination devices 120, 130, and 140 may each include a processor (e.g., a processor 121), a memory (e.g., a memory 122), and a wireless interface (e.g., a wireless interface 125). The destination devices 120, 130, and 140 may also each include a packet generator 124 configured to generate packets (e.g., single access packets or multiple access packets), as described with reference to the packet generator 114. In one example, the memory 122 may store tone allocation parameters 123 identical to the one allocation parameters 113.

During operation, the source device 110 may generate and transmit the packet 160 to each of the destination devices 120, 130, and 140 via the wireless network 150. The packet 160 may be communicated using a waveform that includes non-overlapping sets of tones, where each set of tones is allocated to an individual destination device. For example, a first set of tones may be allocated to the first destination device 120, a second set of tones may be allocated to the second destination device 130, and a third set of tones may be allocated to the third destination device 140. Each tone may be an OFDMA tone, and the first set of tones, the second set of tones, and the third set of tones may be non-overlapping with respect to each other. In a particular embodiment, a pilot tone may be allocated to multiple destination devices, as described with reference to FIG. 4. Alternately, pilot tones may be allocated on a per-device basis, as described with reference to FIG. 2.

The system 100 of FIG. 1 may thus provide physical layer (PHY) OFDMA parameters for use by source devices and destination devices to communicate over an IEEE 802.11 wireless network. For example, the tone allocation parameters 113, 123 (or portions thereof) may be stored in a memory of the source and destination devices, as shown, may be standardized by a wireless standard (e.g., an IEEE 802.11 standard), etc. It should be noted that various tone allocation plans described herein may be applicable for both downlink (DL) as well as uplink (UL) OFDMA communication.

For example, the source device 110 (e.g., an access point) may receive an uplink communication via the wireless network 150. The uplink communication may be communicated using a second waveform that includes the sets of tones allocated to the destination devices 120, 130, and 140. Each set of tones may include data transmitted by the corresponding destination device 120, 130, and 140. For example, the first set of tones may include data transmitted to the source device 110 by the first destination device 120, the second set of tones may include data transmitted to the source device 110 by the second destination device 130, and the third set of tones may include data transmitted to the source device 110 by the third destination device 140. In an illustrative embodiment, the uplink communication may have a tone allocation as described with reference to one or more of FIGS. 2-5.

Figure 2:
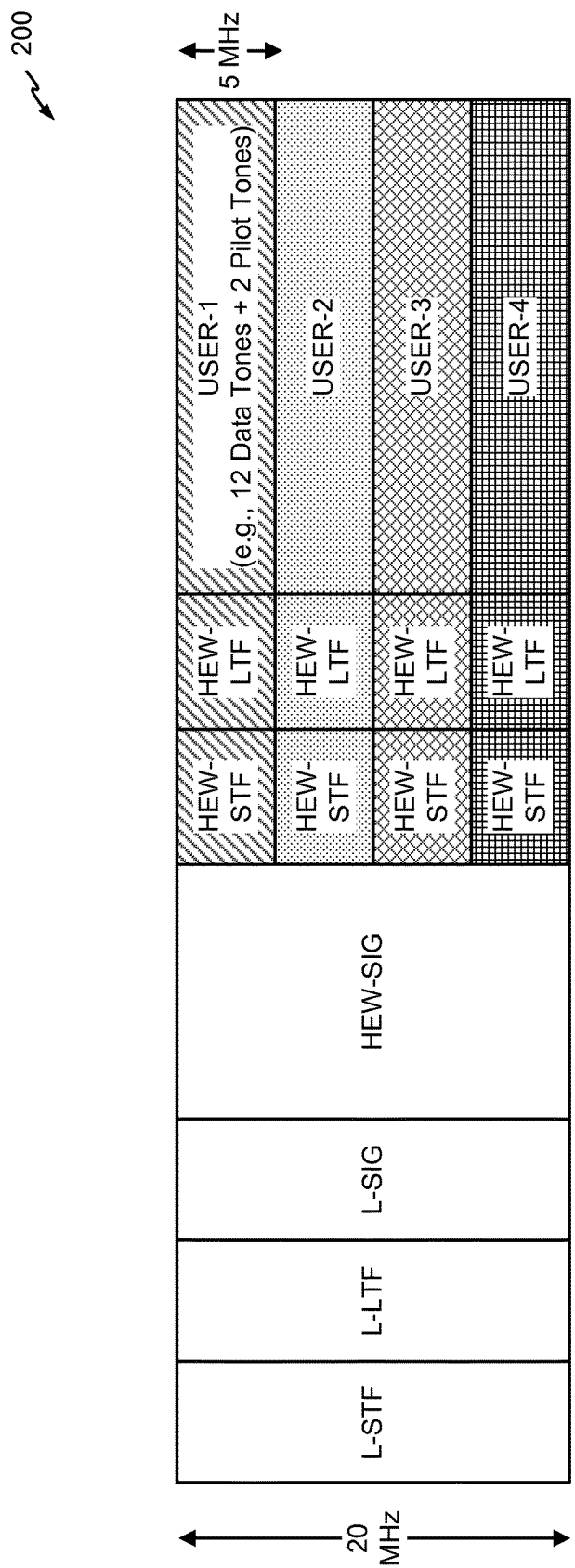
FIG. 2 is a diagram to illustrate a particular example of tone allocation in a multiple access packet.

FIG. 2 illustrates an example of a four-station (e.g., four destination devices) OFDMA packet 200 having localized tone allocation without frequency hopping. In an illustrative embodiment, the packet 200 may be the packet 160 of FIG. 1. In the example of FIG. 2, the packet 200 is a 20 MHz packet. In alternate embodiments, the packet 200 may occupy a larger or smaller bandwidth.

As shown in FIG. 2, the packet 200 may include a legacy short training field (L-STF), a legacy long training field (L-LTF), and a legacy signal (L-SIG) field. The L-STF, L-LTF, and L-SIG fields may collectively be referred to as a legacy preamble of the packet 200. In a particular embodiment, the legacy preamble enables legacy devices (e.g., non-HEW devices) to detect the packet 200, even though the legacy devices may be unable to process portions of the packet 200 that follow the legacy preamble. Examples of legacy devices may include, but are not limited to, IEEE 802.11 a/b/g/n/ac devices. Even though the legacy devices may not be able to process portions of the packet 200 that follow the legacy preamble, the legacy preamble may be used to prevent the legacy devices from congesting a wireless medium during the duration of the packet 200. For example, the legacy preamble may include a duration field, and the legacy devices may refrain from congesting the medium for the duration indicated by the duration field. A legacy device may recognize and distinguish between L-STF, L-LTF, and L-SIG fields based on "known" locations, lengths, and/or content of the fields in the preamble of the packet 200. For example, locations, lengths, and/or content of the L-STF, L-LTF, and L-SIG fields may be set by a wireless protocol or standard, such as an IEEE 802.11 a/b/g/n/ac standard.

The packet 200 may also include a HEW-SIG field, one or more HEW-STF fields, one or more HEW-LTF fields, and per-user data/pilot tones, as shown. A device may recognize and distinguish between HEW-STF, HEW-LTF, and HEW-SIG fields based on "known" locations, lengths, and/or content of the fields in the packet 200. For example, locations, lengths, and/or content of the HEW-STF, HEW-LTF, and HEW-SIG fields may be set by a wireless protocol or standard, such as an IEEE 802.11 HEW standard.

In FIG. 2, the 4-station packet 200 includes a HEW-STF field and a HEW-LTF field for each of the four stations. The packet 200 also includes localized tone allocation for each of the four stations. To illustrate, a first contiguous set of tones USER-1 is allocated to a first station and includes data tones and pilot tones (e.g., per-user pilot tones) for the first station. In the example of FIG. 2, each of the USER-1 tones is in a first 5 MHz frequency sub-band. A second contiguous set of tones USER-2 is allocated to a second station, where each USER-2 tone is in a second 5 MHz frequency sub-band. A third contiguous set of tones USER-3 is allocated to a third station, where each USER-3 tone is in a third 5 MHz frequency sub-band. A fourth contiguous set of tones USER-4 is allocated to a fourth station, where each USER-4 tone is in a fourth 5 MHz frequency sub-band. The first, second, third, and fourth sets of tones are non-overlapping with respect to each other. In an illustrative example, each station may be allocated twelve data tones and two pilot tones. In FIG. 2, the localized tone allocation is performed without frequency hopping. That is, each tone allocated to a specific station is in the same 5 MHz frequency sub-band. When pilot tones are allocated on a per-destination device basis, each pilot tone may be allocated to a single destination device. For example, a first pilot tone may be allocated to the first station (but not to the second, third, or fourth stations), a second pilot tone may be allocated to the second station (but not to the first, thirds or fourth stations), etc. In an alternate embodiment, localized tone allocation may be performed with frequency hopping, as illustrated with reference to FIG. 3.

In a particular embodiment, the HEW-SIG field may include tone allocation information. A receiving device (e.g., one of the four stations) may use the tone allocation information to identify which tones (data and pilot) are allocated to that receiving device. The receiving device may process the identified tones (e.g., by performing demodulation, decoding, etc.) that are directed to that receiving device. In an alternate embodiment, one or more pilot tones may be allocated to multiple receiving devices, as described with reference to FIG. 4.

In a particular embodiment, when localized tone allocation without frequency hopping is used with per-user pilots, receiving stations may switch to smaller bandwidth processing after processing the HEW-SIG field. The switch to smaller bandwidth processing may save power. To illustrate, each receiving station may initially perform 20 MHz processing on the packet 200. After processing the HEW-SIG field (e.g., during a high efficiency Wi-Fi short training field (HEW-STF)), each receiving station may switch to 5 MHz processing and may only process their allocated tones.

Figure 3:
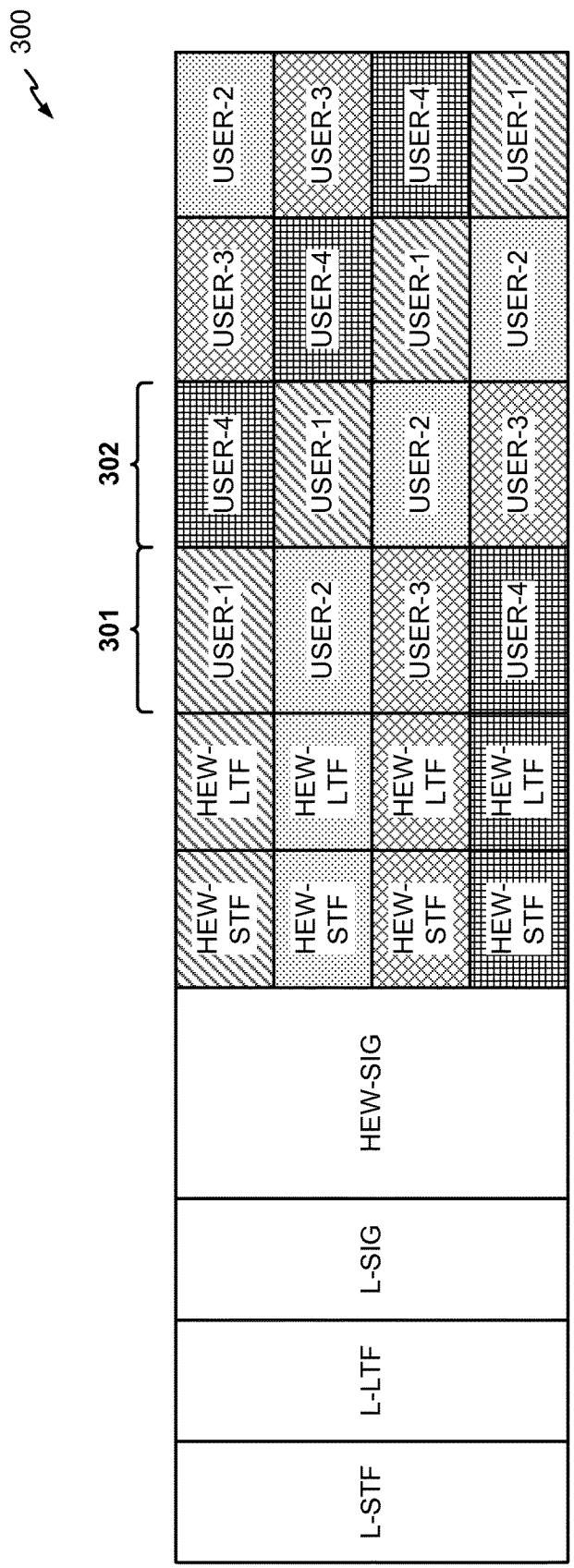
FIG. 3 is a diagram to illustrate another particular example of tone allocation in a multiple access packet.

FIG. 3 illustrates an example of a four-station OFDMA packet 300 having localized tone allocation with frequency hopping. In an illustrative embodiment, the packet 300 is the packet 160 of FIG. 1.

As shown in FIG. 3, the packet 300 may include a L-STF field, a L-STF field, a L-SIG field, a HEW-SIG field, and per-user HEW-STF and HEW-LTF fields. The packet 300 may also include per-user data/pilot tones. In contrast to FIG. 2, which illustrates localized tone allocation without frequency hopping, FIG. 3 illustrates localized tone allocation in which the tones allocated to a specific destination device frequency-hop across symbols. To illustrate, a first tone allocated to the first station (USER-1) in one or more first symbols 301 is in a first frequency sub-band, and a second tone allocated to the first station in one or more second symbols 302 is in a second frequency sub-band. Similarly, the tones allocated to the second, third, and fourth stations (USER-2, USER-3, and USER-4) also frequency-hop. For ease of illustration, a round-robin frequency hopping pattern is shown in FIG. 3. In alternate embodiments, different frequency hopping patterns may be used (e.g., a random hopping pattern may be generated and used). In a particular embodiment, frequency hopping may provide frequency diversity, which may improve overall performance in a wireless system.

Figure 4:
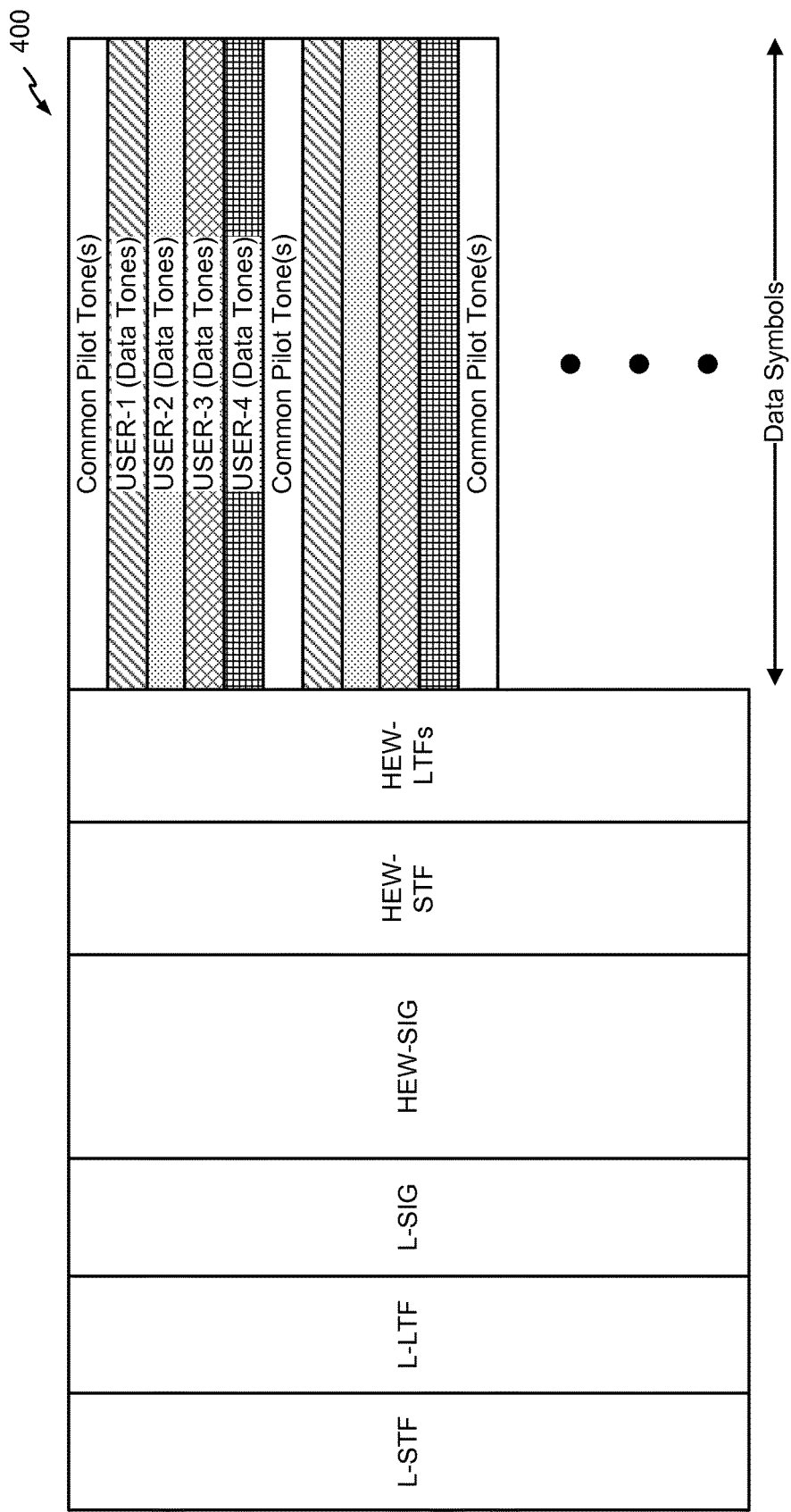
FIG. 4 is a diagram to illustrate another particular example of tone allocation in a multiple access packet.

FIG. 4 illustrates an example of a four station OFDMA packet 400 with interleaved tone allocation. In an illustrative embodiment, the packet 400 may be the packet 160 of FIG. 1.

As shown in FIG. 4, the tones allocated to each destination device may be interleaved across a frequency band of the waveform used to communicate the packet 400. For example, a first set of tones allocated to a first destination device (e.g., USER-1) may be interleaved with a second set of tones allocated to a second destination device (e.g., USER-2) across the frequency band. One or more "common" pilot tones may be allocated to all stations, as shown.

In a particular embodiment, the same pilot scheme may be used in both uplink (UL) and downlink (DL) scenarios. Alternately, different pilot schemes may be used in UL and DL scenarios. For example, per-user (e.g., per-station) pilots may be used for UL communication and common pilots may be used for DL communication. When common pilots are used for DL communication, each station may perform a FFT across the entire bandwidth occupied by a packet so that all common pilot tones can be processed.

It will be appreciated that FIGS. 2-3 illustrate per-user (e.g., per-station) pilot tones, whereas FIG. 4 illustrates common pilot tones. In alternate configurations, common pilot tones may be used with localized tone allocation and per-user pilot tones may be used with interleaved tone allocation. In a particular embodiment, when per-user pilot tones are used, each user may be allocated at least a minimum number of pilot tones. For performance reasons, the minimum number of pilot tones may be greater than one. For example, for 20 MHz transmission with four users and 64 total tones (e.g., 64-point FFT), each user may be allocated at least 2 pilot tones. Each of the four users may also be allocated 12 data tones. In a particular embodiment, because at least 2 pilot tones may be allocated per user, each receiving station may have a minimum processing bandwidth (e.g., 5 MHz or another bandwidth). For example, the minimum processing bandwidth may be defined by a standard (e.g., an 802.11 standard).

It should be noted that in FIGS. 2-4, it is assumed that each station is allocated an equal number of tones. In alternate embodiments, one station may be allocated a different number of tones than another station. It should also be noted that deviations from the specific examples shown in FIGS. 2-4 may be possible. For example, FIGS. 2-4 do not illustrate "unusable" tones such as guard tones and DC tones, although such tones may be interspersed amongst the USER-1, USER-2, USER-3, and USER-4 portions.

Figure 5:
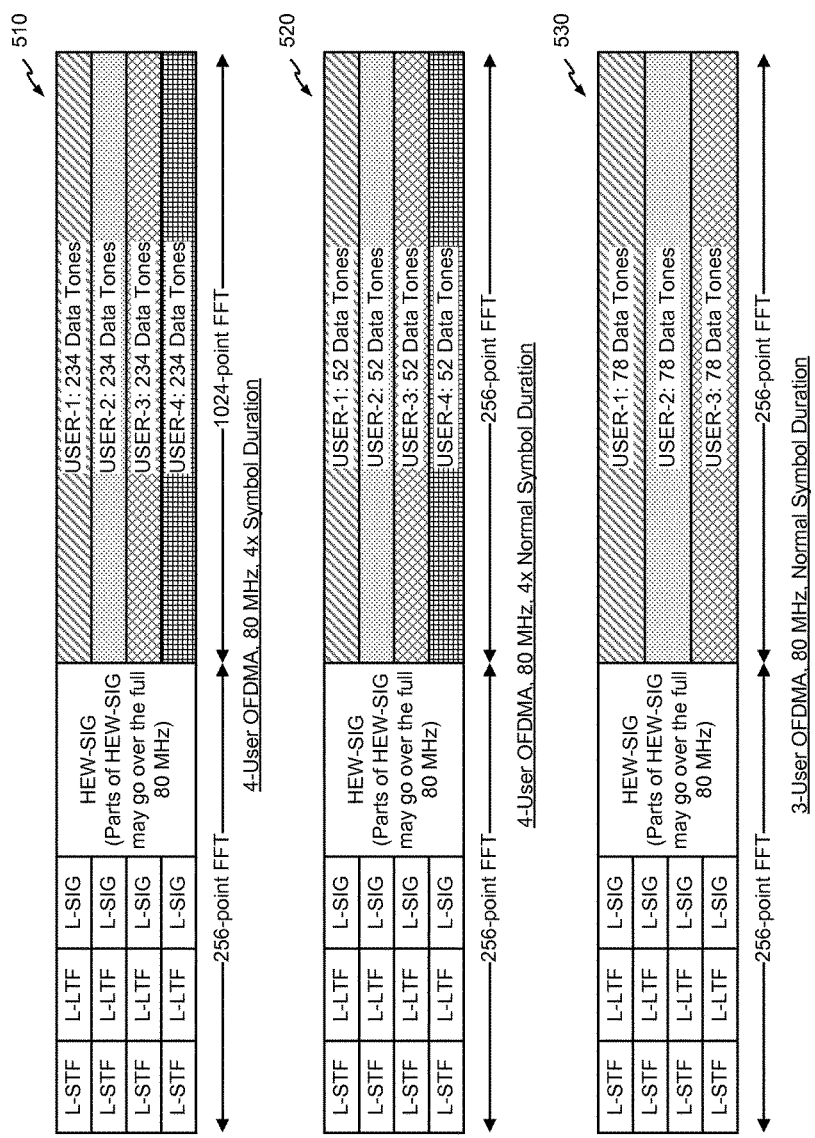
FIG. 5 is a diagram to illustrate additional examples of tone allocation in a multiple access packet.

FIG. 5 is a diagram to illustrate additional examples of tone allocation in a multiple access packet (e.g., the packet 160 of FIG. 1). A first example packet 510 is a 4-user OFDMA packet spanning 80 MHz and having 4× symbol duration (e.g., 4 times the number of tones as compared to a "standard" 80 MHz 802.11 packet). In FIG. 5, the legacy preamble fields are repeated across the four 20 MHz sub-bands. Additionally, parts of the HEW-SIG field may go over the full 80 MHz (e.g., the HEW-SIG field may not be repeated across frequency in chunks of 20 MHz and may instead have different data in different 20 MHz chunks). The legacy preamble fields and HEW-SIG fields may be processed using a 256-point FFT (e.g., may occupy 256 tones). The USER-1, USER-2 USER-3, and USER-4 portions may be processed using a 1024-point FFT (e.g., may occupy 1024 tones). In the packet 510, each user is allocated 234 data tones.

A second example packet 520 is a 4-user OFDMA packet spanning 80 MHz and having "normal" symbol duration. In the packet 520, the USER-1, USER-2, USER-3, AND USER-4 portions may be processed using a 256-point FFT (e.g., may occupy 256 tones), and each user may be allocated 52 data tones.

A third example packet 530 is a 3-user OFDMA packet spanning 80 MHz and having "normal" symbol duration. In the packet 530, the USER-1, USER-2, and USER-3 portions may be processed using a 256-point FFT (e.g., may occupy 256 tones), and each user may be allocated 78 data tones.

It should be noted that the tone plans illustrated in FIG. 5 are for example only. In alternate embodiments, different tone plans may be used. In one example, in the case of "normal" symbol duration with 20 MHz total bandwidth and 4 users, 12 data tones per user and 2 pilot tones per user may be allocated in 5 MHz per user. In the case of 4× symbol duration with 20 MHz total bandwidth and 4 users, 52 data tones and 4 pilot tones per user may be allocated. In the case of 2× symbol duration with 20 MHz total bandwidth and 4 users, a 32 point FFT IEEE 802.11 ah tone plan may be used for each user in each 5 MHz region.

It should also be noted that tone allocation in 5 MHz frequency sub-bands may enable a source device (e.g., an access point) to allocate multiple 5 MHz frequency sub-bands to a user (e.g., destination device) and have independent decoding/encoding per 5 MHz frequency sub-band. This may be especially useful when interference levels are different for different 5 MHz frequency sub-bands. Thus, a scheme that includes characteristics common with long term evolution (LTE) carrier aggregation may be selectively implemented for HEW networks. In LTE carrier aggregation, overhead loss of extra guard tones may be acceptable, or the guard tones may be used for other purposes, for example as null tones for interference estimation.

In a particular embodiment, a wireless standard (e.g., an IEEE 802.11 standard) may establish a set of "allowed" tone plans to choose from. For each allowed tone plan, "optimal" interleaver parameters may be determined and incorporated into the standard. Because determining "optimal" or desirable interleaver parameters may be difficult, the standard may limit selection of tone plans to "allowed" tone plans whose corresponding "optimal" interleaver parameters have been determined. Examples of interleaver parameters for binary convolutional code (BCC) interleavers include, but are not limited to, number of interleaver rows (Nrow), number of interleaver columns (Ncol), and frequency rotation (Nrot). Examples of interleaver parameters for low-density parity-check (LDPC) interleavers include tone mapping distance (Dtm).

Figure 6:
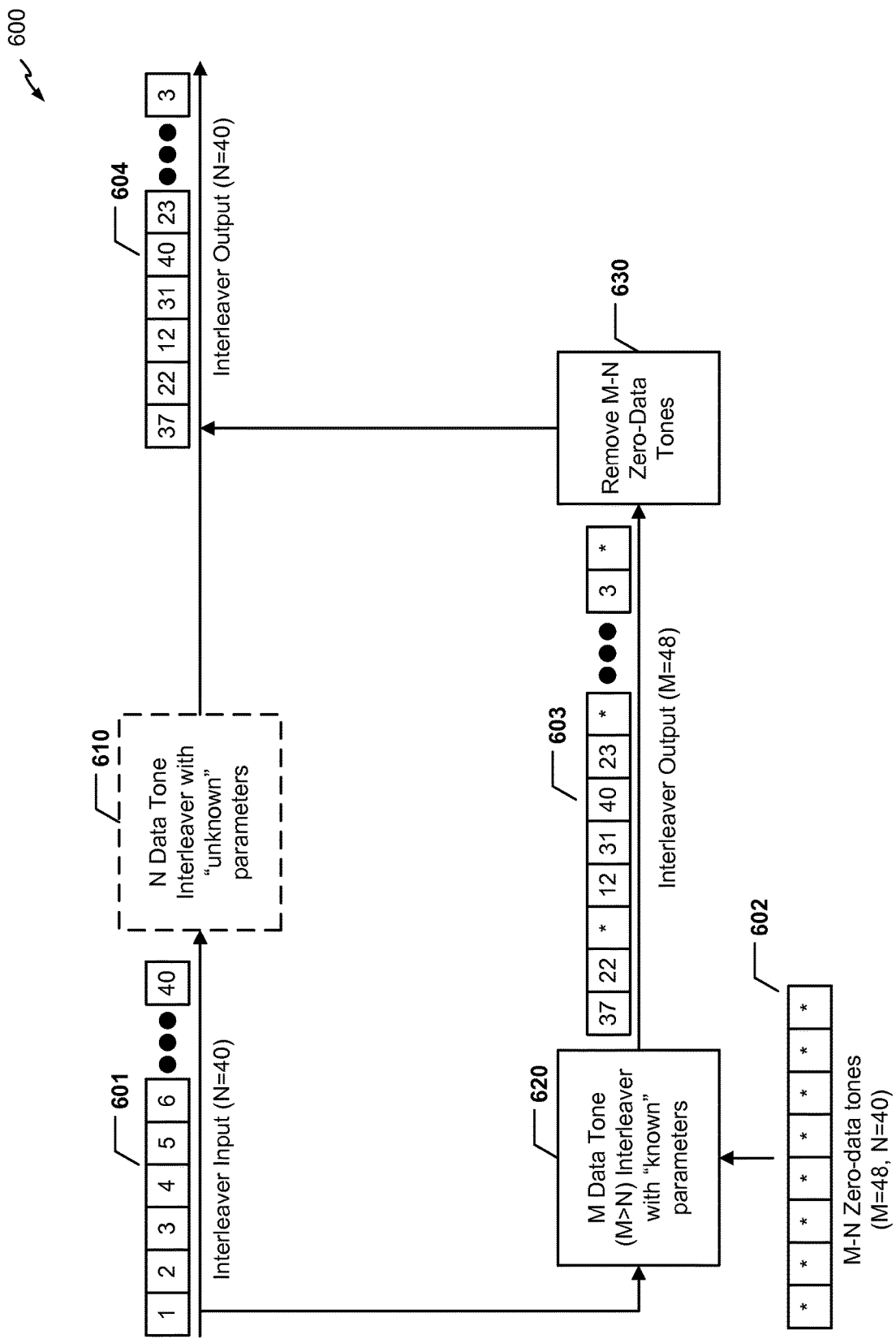
FIG. 6 is a diagram to illustrate a particular embodiment of determining interleaver parameters associated with tone allocation.

FIG. 6 illustrates an embodiment of automatically generating output for an "unknown" interleaver 610 (e.g., an interleaver whose "optimal" parameters are unknown) based on a "known" interleaver 620 (e.g., an interleaver whose optimal parameters are known) and is generally designated 600.

To illustrate, based on existing IEEE 802.11 standards (e.g., IEEE 802.11 a/n/ac/af/ah), parameters for interleavers for 24, 48, 52, 108, 216, 234, 432, and 468 data tones may be known. However, parameters for other interleavers may be unknown, including, for example, the tone plan described with reference to FIGS. 2-4 in which each of four users is allocated 12 data tones.

In accordance with the described techniques, interleaver output for the "unknown" interleaver 610 may be generated based on the "known" interleaver 620. As an example, the "unknown" interleaver 610 may be configured to interleave N data tones. In FIG. 6, N=40. As described above, parameters for a 40-tone interleaver may not be known. To construct a 40-tone interleaver, a known interleaver that is configured to interleave M tones may be identified, where M is greater than N but as close to N as possible. For example, in FIG. 6, M=48.

Interleaver input 601 including 40 data tones (designated 1, 2, 3 . . . 40 in FIG. 6) may be input into the 48-tone interleaver 620. M minus N (M–N) "zero-data" tones 602 (e.g., 8 zero-data tones in FIG. 6) may also be input into the 48-tone interleaver 620. A "zero-data" tone may be a simulated data tone that can be easily identified in interleaver output.

The 48-tone interleaver 620 may generate interleaver output 603, where the interleaver output includes the 40 data tones and the 8 zero-data tones, as shown. The zero-data tones may then be removed, at 630, to generate interleaver output 604 corresponding to the "unknown" 40-tone interleaver 610. Although the interleaver output 604 may not be "optimal," the interleaver output 604 may be sufficiently random to enable reliable communication via a HEW network. The method illustrated in FIG. 6 may thus be used to construct or simulate an unknown interleaver from a known interleaver, which may increase a number of tone plans available for use in OFDMA communication and may enable the flexibility to allocate an arbitrary number of data tones to each user.

In a particular embodiment, an OFDMA packet generated in accordance with the described techniques may be communicated using a waveform that includes 12, 36, 72, 120, 156, or 312 data tones per user. The interleaver parameters corresponding to each of the tone plans may be determined dynamically by a transmitting device according to the method 600 of FIG. 6. In a particular embodiment, a tone plan design criteria for HEW may include having at least one tone plan in which all users (e.g., 2 users, 3 users, 4 users, etc.) are allocated an equal or nearly equal number of data tones. The tone plan design criteria may also include keeping wasted (e.g., unallocated) tones to as small a number as possible. In an embodiment, the tone plan design criteria may also include keeping excluded (e.g., invalid) modulation and coding schemes (MCSs) to as small a number of possible. To illustrate, a MCS may be excluded if a ratio of a number of coded bits per symbol (N_cbps) to a number of encoders used (N_es) is an integer. In one example, the described tone plans having 12, 36, and 72 data tones may have 0 excluded MCSs. The tone plan having 120 data tones may have 2 excluded MCSs, the tone plan having 156 data tones may have 1 excluded MCS, and the tone plan having 312 data tones may have 4 or 6 excluded MCSs.

Figure 7:
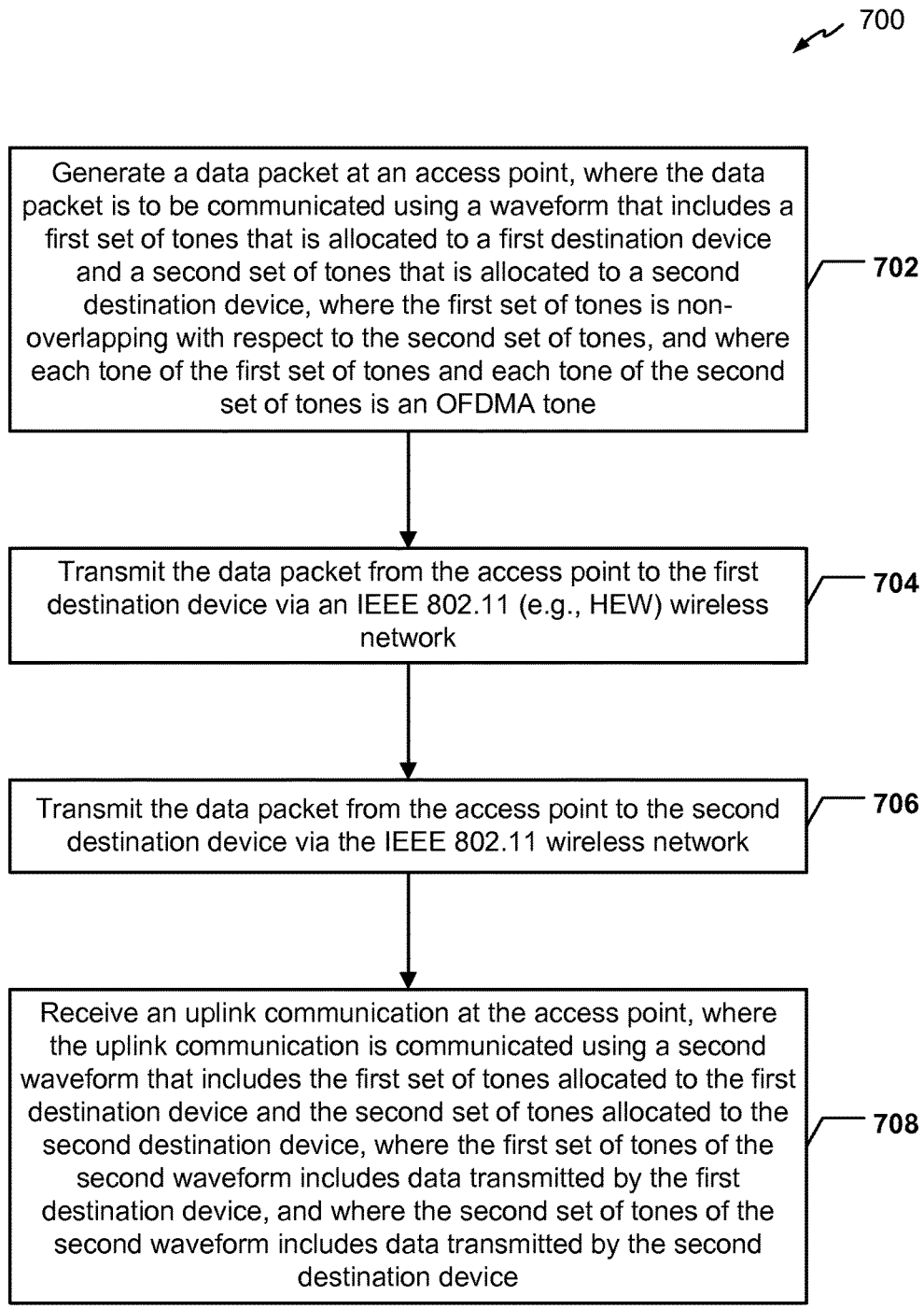
FIG. 7 is a flowchart to illustrate a particular embodiment of a method of operation at the system of FIG. 1.

FIG. 7 is a diagram to illustrate a particular embodiment of a method 700 of operation at the system 100 of FIG. 1. In an illustrative embodiment, the method 700 may be performed by the source device (e.g., access point) 110 of FIG. 1.

The method 700 may include generating a data packet at an access point, at 702. The data packet is to be communicated using a waveform that includes a first set of tones that is allocated to a first destination device and a second set of tones that is allocated to a second destination device. The first set of tones may be non-overlapping with respect to the second set of tones. Each tone of the first set of tones and each tone of the second set of tones may be an OFDMA tone. For example, in FIG. 1, the source device 110 may generate the packet 160. The packet 160 may be communicated using a waveform that includes a first set of tones that is allocated to the first destination device 120 and a second set of tones that is allocated to the second destination device 130, where the first set of tones does not overlap the second set of tones. In an illustrative embodiment, the allocated tones of the first set and/or the second set may be localized without frequency hopping (e.g., as shown in FIG. 2), localized with frequency hopping (e.g., as shown in FIG. 3), or interleaved (e.g., as shown in FIG. 4). The waveform used to communicate the packet 160 may include per-user pilot tones (e.g., as shown in FIGS. 2-3) or may include common pilot tones (e.g., as shown in FIG. 4).

The method 700 may also include transmitting the data packet from the access point to the first destination device via an IEEE 802.11 (e.g. HEW) wireless network, at 704, and transmitting the data packet from the access point to the second destination device via the IEEE 802.11 wireless network, at 706. For example, in FIG. 1, the source device 110 may transmit the packet 160 to the destination devices 120 and 130 via the wireless network 150. It should be noted that although transmission of the data packet to the first destination device and to the second destination device is illustrated in FIG. 7 as being performed in separate steps, this is not to be considered limiting. As described with reference to FIG. 1, transmitting the packet 160 to the destination devices 120 and 130 may be performed via transmission of a single copy of the packet 160 that is received by each of the destination devices 120 and 130.

In an example, the method 700 may further include receiving an uplink communication at the access point, at 708. The uplink communication may be communicated using a second waveform that includes the first set of tones allocated to the first destination device and the second set of tones allocated to the second destination device. The first set of tones of the second waveform may include data transmitted by the first destination device, and the second set of tones of the second waveform may include data transmitted by the second destination device. Thus, the tone allocation plans described herein may be used for multiple access communication from an access point to destination device(s) as well as from the destination device(s) to the access point.

Figure 8:
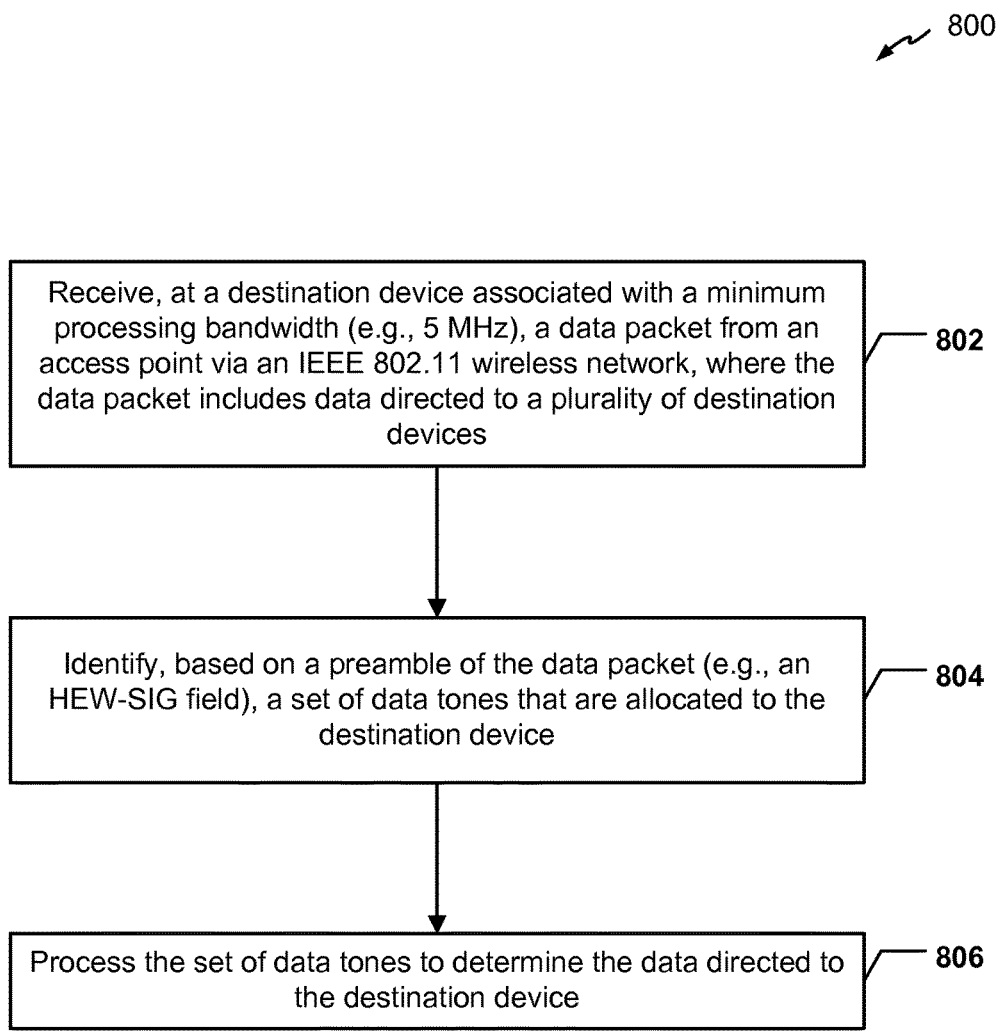
FIG. 8 is a flowchart to illustrate another particular embodiment of a method of operation at the system of FIG. 1.

FIG. 8 is a diagram to illustrate another particular embodiment of a method 800 of operation at the system of FIG. 1. In an illustrative embodiment, the method 800 may be performed by the destination device 120 of FIG. 1.

The method 800 may include receiving, at a destination device, a data packet from an access point via a wireless network, at 802. The data packet may include data directed to a plurality of destination devices. Each of the destination devices may be associated with a minimum processing bandwidth (e.g., 5 MHz) and the wireless network may be an IEEE 802.11 network. For example, in FIG. 1, the destination device 120 may receive the packet 160 from the source device 110 via the wireless network 150.

The method 800 may also include identifying, based on a preamble of the data packet, a set of data tones that are allocated to the destination device, at 804. In an illustrative embodiment, the set of data tones may be identified based on tone allocation information included in a HEW-SIG field of the data packet, as described with reference to FIGS. 2-4.

The method 800 may further include processing the identified set of data tones to determine the data directed to the destination device, at 806. For example, in FIG. 1, the destination device 120 may process the identified set of data tones to determine data in the packet 160 that is directed to the destination device 120. In a particular embodiment, when localized tone allocation is used, the destination device 120 may conserve power by switching to lower bandwidth processing after identifying its allocated set of tones (e.g., the destination device may switch from 20 MHz processing to 5 MHz processing).

Figure 9:
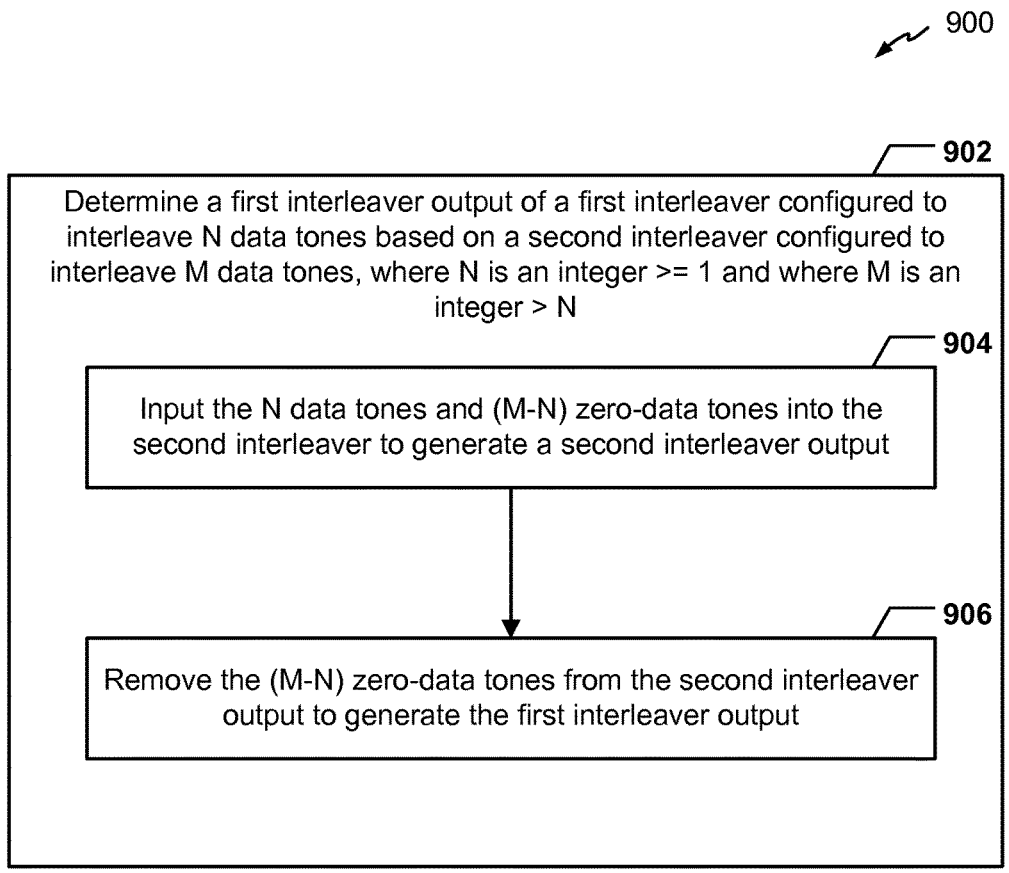
FIG. 9 is a flowchart to illustrate a particular embodiment of a method of determining interleaver parameters associated with tone allocation.

FIG. 9 is a diagram to illustrate a particular embodiment of a method 900 of determining interleaver parameters associated with tone allocation. In an illustrative embodiment, the method 900 may be performed by any of the devices 110, 120, 130, or 140 of FIG. 1 and may be illustrated with reference to FIG. 6.

The method 900 includes determining a first interleaver output of a first interleaver (e.g., the interleaver 610 of FIG. 6) configured to interleave N data tones based on a second interleaver (e.g., the interleaver 620 of FIG. 6) configured to interleave M data tones, at 902. N and M are integers and M is greater than N.

Determining the first interleaver output may include inputting the N data tones (e.g., the input 601) and (M−N) zero-data tones (e.g., the zero-data tones 602) into the second interleaver to generate a second interleaver output (e.g., the interleaver output 603), at 904. Determining the first interleaver output may also include removing the (M−N) zero-data tones from the second interleaver output to generate the first interleaver output (e.g., the interleaver output 604), at 906.

Figure 10:
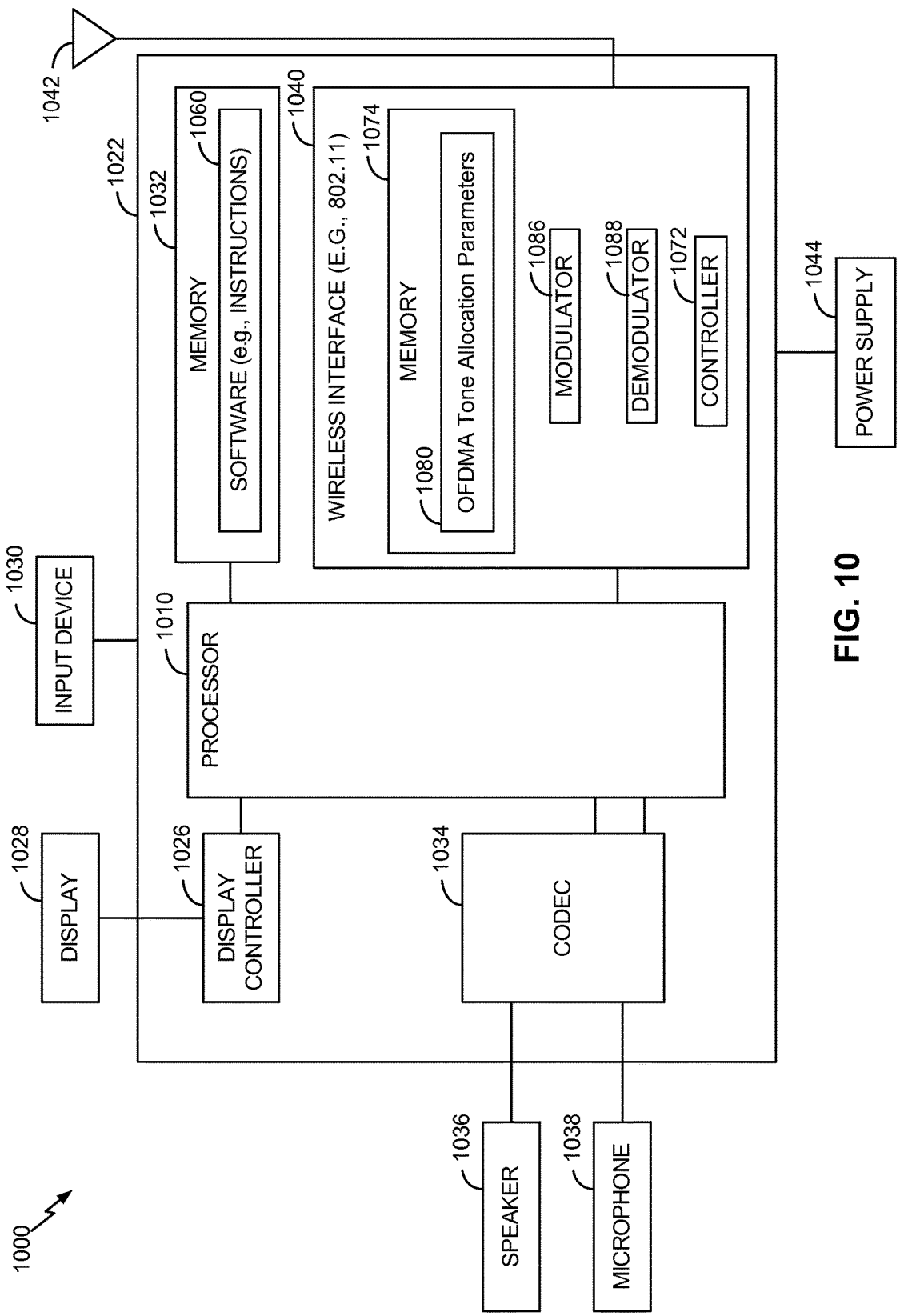
FIG. 10 is a diagram of a wireless device that is operable to support various embodiments of one or more methods, systems, apparatuses, and/or computer-readable media disclosed herein.

Referring to FIG. 10, a block diagram of a particular illustrative embodiment of a wireless communication device is depicted and generally designated 1000. The device 1000 may be a wireless electronic device and may include a processor 1010, such as a digital signal processor (DSP), coupled to a memory 1032. In an illustrative embodiment, the device 1000 may be one of the devices 110, 120, 130, or 140 of FIG. 1.

The processor 1010 may be configured to execute software 1060 (e.g., a program of one or more instructions) stored in the memory 1032. Additionally or alternatively, the processor 1010 may be configured to implement one or more instructions stored in a memory 1074 of a wireless interface 1040, as described further herein. In a particular embodiment, the processor 1010 may be configured to operate in accordance with one or more of operations or methods described with reference to FIGS. 1-9.

A wireless interface 1040 may be coupled to the processor 1010 and to an antenna 1042 such that wireless data received via the antenna 1042 and the wireless interface 1040 may be provided to the processor 1010. For example, the wireless interface 1040 may include or correspond to the wireless interface 115 of FIG. 1 or the wireless interface 125 of FIG. 1. The wireless interface 1040 may include the memory 1074 and a controller 1072. The memory 1074 may include tone OFDMA tone allocation parameters 1080 (e.g., the OFDMA tone allocation parameters 113 or 123 of FIG. 1). In a particular embodiment, the wireless interface 1040 may also include a modulator 1086 and a demodulator 1088 for uplink and downlink communication, respectively.

The controller 1072 may be configured to interface with the processor 1010 to execute one or more instructions stored in the memory 1074. The controller 1072 may also be configured to interface with the processor 1010 to execute the modulator 1086 and/or the demodulator 1088. Additionally or alternatively, the controller 1072 may include a processor configured to execute one or more of the instructions stored in the memory 1074. The wireless interface 1040 and/or the processor 1010 may also be configured to perform FFT and inverse FFT (IFFT) operations.

In a particular embodiment, the processor 1010, the display controller 1026, the memory 1032, the CODEC 1034, and the wireless interface 1040, are included in a system-in-package or system-on-chip device 1022. In a particular embodiment, an input device 1030 and a power supply 1044 are coupled to the system-on-chip device 1022. Moreover, in a particular embodiment, as illustrated in FIG. 10, the display device 1028, the input device 1030, the speaker 1036, the microphone 1038, the antenna 1042, and the power supply 1044 are external to the system-on-chip device 1022. However, each of the display device 1028, the input device 1030, the speaker 1036, the microphone 1038, the antenna 1042, and the power supply 1044 can be coupled to one or more components of the system-on-chip device 1022, such as one or more interfaces or controllers.

One or more of the disclosed embodiments may be implemented in a system or an apparatus, such as the device 1000, that may include a communications device, a fixed location data unit, a mobile location data unit, a mobile phone, a cellular phone, a satellite phone, a computer, a tablet, a portable computer, or a desktop computer. Additionally, the device 1000 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-10 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

In conjunction with the described embodiments, an apparatus includes means for generating a data packet at an access point. The data packet is to be communicated using a waveform that includes a first set of tones that is allocated to a first destination device and a second set of tones that is allocated to a second destination device. The first set of tones is non-overlapping with respect to the second set of tones. Each tone of the first set of tones and each tone of the second set of tones is an OFDMA tone. For example, the means for generating the data packet may include the processor 111, the packet generator 114 of FIG. 1, the modulator 1086, the controller 1072, the processor 1010 of FIG. 10, another device configured to generate a data packet, or any combination thereof. The apparatus may also include means for transmitting the data packet from the access point to the first destination device and to the second destination device via an IEEE 802.11 wireless network. For example, the means for transmitting may include the wireless interface 115 of FIG. 1, the wireless interface 1040 of FIG. 10 (or a component thereof), the antenna 1042, another device configured to transmit data, or any combination thereof.

In conjunction with the described embodiments, an apparatus includes means for receiving, at a destination device, a data packet from a source device via an IEEE 802.11 wireless network. The data packet includes data directed to each of a plurality of destination devices. For example, the means for receiving may include the wireless interface 125 of FIG. 1, the wireless interface 1040 of FIG. 10 (or a component thereof), the antenna 1042, another device configured to receive data, or any combination thereof. The apparatus also includes means for identifying, based on a preamble of the data packet, a set of data tones that are allocated to the destination device. For example, the means for identifying may include the processor 121 of FIG. 1, the demodulator 1088, the controller 1072, the processor 1010 of FIG. 10, another device configured to identify a set of data tones based on a preamble of a data packet, or any combination thereof. The apparatus further includes means for processing the set of data tones to determine the data directed to the destination device. For example, the means for processing may include the processor 121 of FIG. 1, the demodulator 1088, the controller 1072, the processor 1010 of FIG. 10, another device configured to process a set of data tones, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   generating a data packet at an access point, wherein the data packet includes a field configured to identify tones in a plurality of frequency sub-bands that are allocated to each of a plurality of destination devices, wherein the data packet is to be communicated using a waveform that includes a first set of tones that is allocated to a first destination device of the plurality of destination devices and a second set of tones that is allocated to a second destination device of the plurality of destination devices, wherein the first set of tones is non-overlapping with respect to the second set of tones, and wherein each tone of the first set of tones and each tone of the second set of tones is an orthogonal frequency-division multiple access (OFDMA) tone;

transmitting the data packet from the access point to the first destination device via a wireless network; and transmitting the data packet from the access point to the second destination device via the wireless network.

2. The method of claim 1, wherein each tone of the first set of tones is in a first frequency sub-band of the plurality of frequency sub-bands, and each tone of the second set of tones is in a second frequency sub-band of the plurality of frequency sub-bands.

3. The method of claim 1, wherein a first tone of the first set of tones is in a first frequency sub-band of the plurality of frequency sub-bands, and wherein a second tone of the first set of tones is in a second frequency sub-band of the plurality of frequency sub-bands.

4. The method of claim 1, wherein the data packet includes a preamble that includes a long training field and a short training field.

5. The method of claim 1, wherein the first set of tones and the second set of tones are interleaved across a frequency band.

6. The method of claim 1, further comprising:
receiving an uplink communication at the access point, wherein the uplink communication is communicated using a second waveform that includes the first set of tones allocated to the first destination device and the second set of tones allocated to the second destination device, wherein the first set of tones of the second waveform includes data transmitted by the first destination device, and wherein the second set of tones of the second waveform includes data transmitted by the second destination device.

7. The method of claim 1, wherein the first set of tones includes a first pilot tone allocated to the first destination device but not to the second destination device, and wherein the second set of tones includes a second pilot tone allocated to the second destination device but not to the first destination device.

8. The method of claim 1, wherein at least one pilot tone is allocated to the first destination device and to the second destination device.

9. The method of claim 1, wherein the first set of tones includes at least 12 data tones and at least 2 pilot tones allocated to the first destination device.

10. The method of claim 1, wherein the first set of tones includes 36, 72, 120, 156, or 312 data tones allocated to the first destination device.

11. The method of claim 1, wherein the waveform further includes a third set of tones that is allocated to a third destination device, wherein the third set of tones is non-overlapping with respect to the first set of tones and the second set of tones.

12. The method of claim 11, wherein the waveform further includes a fourth set of tones that is allocated to a fourth destination device, wherein the fourth set of tones is non-overlapping with respect to the first set of tones, the second set of tones, and the third set of tones.

13. The method of claim 1, wherein each of the plurality of frequency sub-bands includes a high efficiency Wi-Fi short training field and a high efficiency Wi-Fi long training field.

14. An apparatus comprising:
a processor; and
a memory storing instructions that, when executed by the processor, cause the processor to perform operations comprising:
generating a data packet at an access point, wherein the data packet includes a field configured to identify tones in a plurality of frequency sub-bands that are allocated to each of a plurality of destination devices, wherein the data packet is to be communicated using a waveform that includes a first set of tones that is allocated to a first destination device of the plurality of destination devices and a second set of tones that is allocated to a second destination device of the plurality of destination devices, wherein the first set of tones is non-overlapping with respect to the second set of tones, and wherein each tone of the first set of tones and each tone of the second set of tones is an orthogonal frequency-division multiple access (OFDMA) tone;
transmitting the data packet from the access point to the first destination device via a wireless network; and
transmitting the data packet from the access point to the second destination device via the wireless network.

15. The apparatus of claim 14, wherein the field of the data packet indicates that the first set of tones is allocated to the first destination device and that the second set of tones is allocated to the second destination device.

16. The apparatus of claim 14, wherein the first destination device and the second destination device are each associated with a minimum processing bandwidth.

17. The apparatus of claim 16, wherein the minimum processing bandwidth is 5 megahertz (MHz).

18. The apparatus of claim 14, wherein the first set of tones includes 12 data tones allocated to the first destination device.

19. The apparatus of claim 14, wherein the first set of tones includes 2 pilot tones allocated to the first destination device.

20. The apparatus of claim 14, wherein the memory further stores at least one tone allocation parameter used during generation of the data packet.

21. The apparatus of claim 20, wherein the at least one tone allocation parameter indicates which data tones are to be allocated to the first destination device.

22. The apparatus of claim 20, wherein the at least one tone allocation parameter indicates which pilot tones are to be allocated to the first destination device.

23. The apparatus of claim 20, wherein the at least one tone allocation parameter indicates that a pilot tone is to be allocated to the first destination device and to the second destination device.

24. The apparatus of claim 14, wherein each of the plurality of frequency sub-bands includes a high efficiency Wi-Fi short training field and a high efficiency Wi-Fi long training field.

25. A non-transitory computer-readable medium comprising instructions that, when executed by a computer, cause the computer to perform operations comprising:
generating a data packet at an access point, wherein the data packet includes a field configured to identify tones in a plurality of frequency sub-bands that are allocated to each of a plurality of destination devices, wherein the data packet is to be communicated using a waveform that includes a first set of tones that is allocated to a first destination device of the plurality of destination devices and a second set of tones that is allocated to a second destination device of the plurality of destination devices, wherein the first set of tones is non-overlapping with respect to the second set of tones, and wherein each tone of the first set of tones and each tone of the second set of tones is an orthogonal frequency-division multiple access (OFDMA) tone;

transmitting the data packet from the access point to the first destination device via a wireless network; and transmitting the data packet from the access point to the second destination device via the wireless network.

26. The non-transitory computer-readable medium of claim 25, wherein the first set of tones includes at least 12 data tones and at least 2 pilot tones allocated to the first destination device.

27. The non-transitory computer-readable medium of claim 25, wherein the first set of tones includes 36, 72, 120, 156, or 312 data tones allocated to the first destination device.

28. The non-transitory computer-readable medium of claim 25, wherein each of the plurality of frequency sub-bands includes a high efficiency Wi-Fi short training field and a high efficiency Wi-Fi long training field.

29. An apparatus comprising:

means for generating a data packet at an access point, wherein the data packet includes a field configured to identify tones in a plurality of frequency sub-bands that are allocated to each of a plurality of destination devices, wherein the data packet is to be communicated using a waveform that includes a first set of tones that is allocated to a first destination device and a second set of tones that is allocated to a second destination device, wherein the first set of tones is non-overlapping with respect to the second set of tones, and wherein each tone of the first set of tones and each tone of the second set of tones is an orthogonal frequency-division multiple access (OFDMA) tone; and means for transmitting the data packet from the access point to the first destination device and to the second destination device via a wireless network.

30. The apparatus of claim 29, wherein the first set of tones includes 12 data tones allocated to the first destination device.

* * * * *